March 17, 1959  F. E. WONDISFORD  2,877,518
VINYL INSERT-TYPE THRESHOLD PLATE
Filed Nov. 29, 1957  2 Sheets-Sheet 1

INVENTOR.
FLOYD E. WONDISFORD
BY W. B. Harpman
ATTORNEY

March 17, 1959  F. E. WONDISFORD  2,877,518
VINYL INSERT-TYPE THRESHOLD PLATE
Filed Nov. 29, 1957  2 Sheets-Sheet 2

INVENTOR.
FLOYD E. WONDISFORD
BY
W. B. Harpman
ATTORNEY

United States Patent Office 2,877,518
Patented Mar. 17, 1959

2,877,518

VINYL INSERT-TYPE THRESHOLD PLATE

Floyd E. Wondisford, Youngstown, Ohio, assignor to Youngstown Manufacturing, Inc., Youngstown, Ohio, a corporation of Ohio Application November 29, 1957, Serial No. 699,629

4 Claims. (Cl. 20—64)

This invention relates to threshold plates and more particularly to threshold plates in which a flexible resilient vinyl insert is employed for sealing the area between the threshold plate and a door mounted thereabove.

The principal object of the invention is the provision of a threshold plate having a longitudinally extending channel in its uppermost surface, the channel being of novel configuration for receiving and retaining a flanged tubular vinyl insert.

A further object of the invention is the provision of a threshold plate and vinyl insert combination wherein the configuration of the vinyl insert and the configuration of the threshold plate are such that the vinyl insert is caused to assume and retain a shape preventing its withdrawal from the plate.

A still further object of the invention is the provision of a vinyl insert for a channeled threshold plate, the vinyl insert comprising a tubular member of oval shape in cross section having oppositely disposed flanges on its outer sides adapted to underlie portions of the channeled threshold plate.

A still further object of the invention is the provision of a combination rigid threshold plate and a distortable vinyl insert therefor, the rigid plate acting to shape the distortable vinyl insert when installed therein so as to prevent it from being removed therefrom.

The vinyl insert-type threshold plate disclosed herein comprises an improvement in the art of thresholds and more particularly in the art of thresholds incorporating resilient members for effecting sealing registry with a door or other object moved thereagainst.

Such vinyl insert thresholds as have heretofore been produced have had the common fault of being difficult to assemble and being in questionable registry with the threshold plate so that they were frequently accidentally removed therefrom.

The present threshold and vinyl insert combination completely overcomes this difficulty in that the threshold plate is so shaped that it causes the tubular vinyl insert to assume a distorted position in which one half of the tubular vinyl insert is held in concave position with the edge thereof underlying the overlying portions of the threshold plate. The vinyl insert being held in such position is incapable of being removed either deliberately or accidentally.

Those skilled in the art will observe that the vinyl insert-type threshold plate disclosed herein may be used as a threshold underneath doors, at the sides, tops and edges of swinging doors and between pairs of swinging doors to the end that relatively inexpensive and satisfactory sealing construction may be readily employed in various door openings with various types of closures.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawings, wherein.

Figure 1:
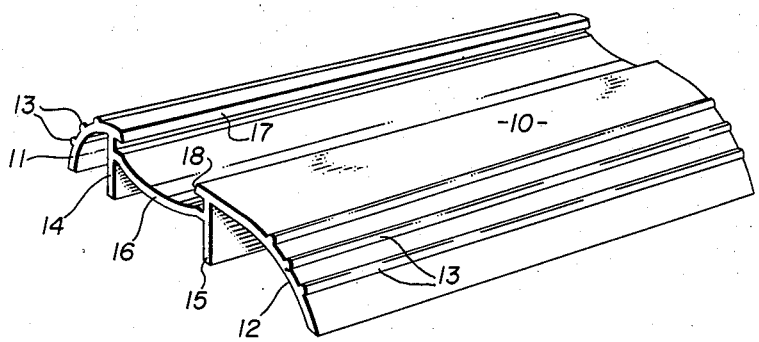
Figure 1 is a perspective view of a threshold plate formed in accordance with the invention.
Figure 2:
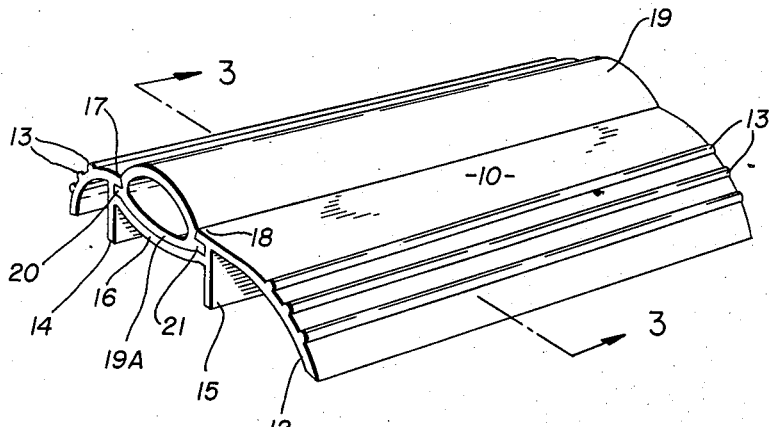
Figure 2 is a perspective view of the threshold plate showing the vinyl insert positioned therein.
Figure 3:
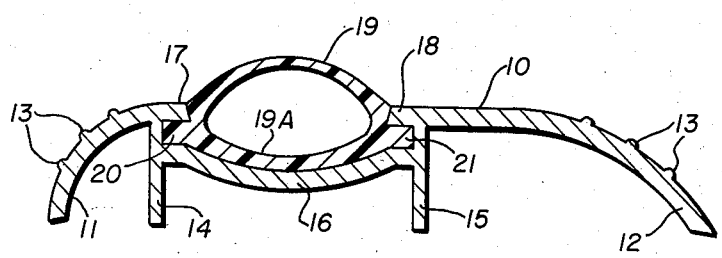
Figure 3 is a horizontal section taken on line 3—3 of Figure 2 and on an enlarged scale.

By referring to the drawings and Figures 1, 2 and 3 in particular it will be seen that a threshold plate 10 is disclosed which comprises a pair of oppositely disposed arcuate sections 11 and 12. Each of the sections is preferably provided with a longitudinally extending rib 13 on its outermost curving surface and the oppositely disposed curving sections 11 and 12 are joined to one another by an integral web taking the form of a pair of vertically standing depending flanges 14 and 15 interconnected by an interconnecting downwardly curved section 16.

It will be observed that the flanges 14 and 15 engage the arcuate sections 11 and 12 inwardly from their oppositely disposed inner edges 17 and 18, respectively, so that the opposite edges 17 and 18 overlie the outermost edges of the downwardly curved section 16.

The threshold plate 10, as just described, is preferably formed of rigid metal, such as aluminum, and may obviously be formed in various sizes and various widths with different degrees of curvatures existing in the sections 11 and 12, all as will occur to those skilled in the art.

In Figures 2 and 3 of the drawings the threshold plate 10 of Figure 1 is shown with a flanged tubular vinyl insert 19 in position therein. The insert 19 is resilient and capable of being deformed so that when the same is installed in the threshold plate 10 with its oppositely disposed longitudinally extending flanges 20 and 21 underlying the flanges 17 and 18 of the threshold plate, the upper portion of the vinyl insert 19 will bow upwardly and outwardly while the lower portion will bow downwardly and inwardly and lie in flat face-to-face relation with the downwardly curving section 16 of the threshold plate 10, as best illustrated in Figure 3 of the drawings.

It will occur to one skilled in the art that the tubular vinyl insert 19 will not readily assume the position disclosed in Figures 2 and 3 of the drawings because of its inherent tendency to form a cross sectionally circular tubular shape. It is therefore necessary for the vinyl insert 19 to be so formed that it is necessary to distort it by moving its lower arcuate portion 19A, as in Figure 3 of the drawings, into a relatively flat arcuate position where it is maintained by its registry against the downwardly curving section 16 of the threshold plate 10.

Figure 4:
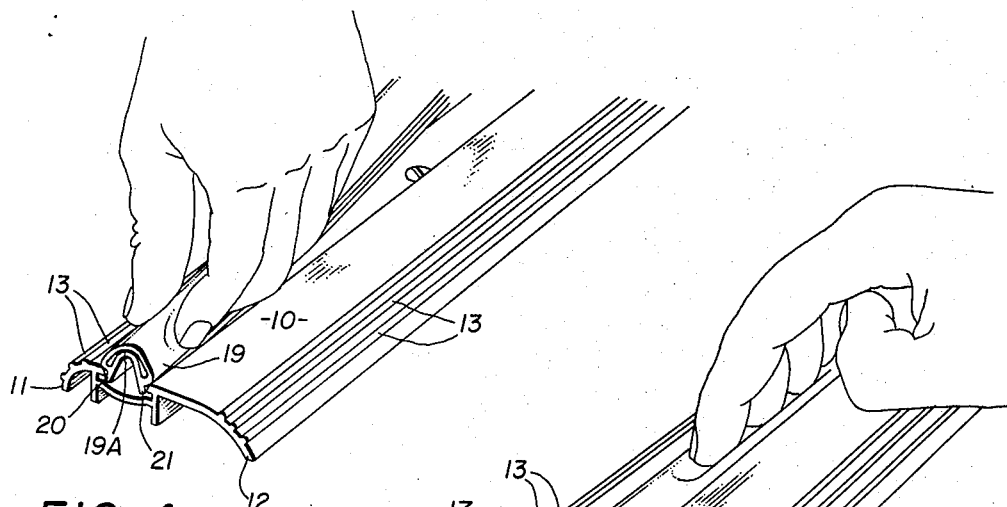
Figure 4 is a perspective view of a section of vinyl insert being installed in a threshold plate.
Figure 5:
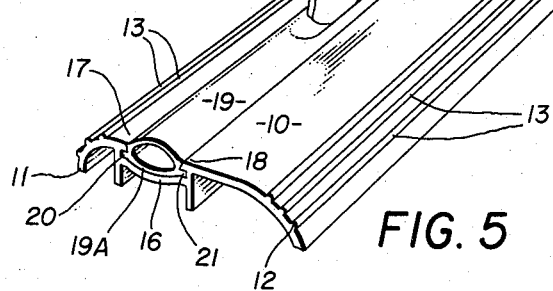
Figure 5 is a perspective view of the vinyl insert being moved into locking position in the threshold plate.

By referring now to Figures 4 and 5 of the drawings, the manner in which the vinyl insert 19 is installed may be seen.

It will be observed in Figure 4 of the drawings that the tubular vinyl insert 19 is first manually deformed as by flattening the same and then bending it into a transverse curve so that the normally lower portion 19A thereof is bowed upwardly. This results in moving the oppositely disposed flanges 20 and 21 inwardly thereby permitting them to be moved into the undercut channel of the threshold plate, as heretofore described.

When the vinyl insert 19 is released from the position shown in Figure 4 of the drawings, it attempts to resume its normal cross sectional circular shape with the result that the normally lower portion 19A tries to move downwardly and by the same token causes the flanges 20 and 21 to move outwardly and in under the flanges 17 and 18.

It will further occur to those skilled in the art that the configuration and positioning of the downwardly curving section 16 will prevent the normally lower portion 19A of the tubular vinyl insert 19 from assuming its complete circular shape with the result that the flanges 20 and 21 thereon are held in maximum outwardly extended position wherein they underlie the flanges 17 and 18 of the threshold plate 10.

As illustrated in Figure 5 of the drawings, the finishing act of installing the insert 19 comprises forcibly moving the normally lower portion 19A of the insert 19 into intimate relation with the downwardly curved section 16 of the threshold plate 10. When this is done, the upper portion of the vinyl insert 19 will assume its upwardly curving position and the vinyl insert will be locked in position in the threshold plate 10 and it can not be removed accidentally or deliberately therefrom without reversing the process of installation and bowing the bottom section in oppositely disposed relation to that shown in Figures 2, 3 and 5 of the drawings whereby the effective width of the insert is reduced so that it may be removed from the channel in the threshold plate 10.

It will occur to those skilled in the art that the shape of the downwardly curved section 16 of the threshold plate 10, the provision of the inwardly extending, oppositely disposed flanges 17 and 18 control the action just described and therefore cause the desirable result of the self-retaining vinyl insert as also just described.

It will further occur to those skilled in the art that because the lower half of the vinyl insert 19 is distorted when installed, it provides an unusually efficient sealing relation against the inner sides and lower edges of the flanges 17 and 18 and prevent water, air and foreign substances from entering the channel of the threshold plate which would obviously be objectionable.

The novelty in the present disclosure resides in the particular construction of the threshold plate and the vinyl insert with its oppositely disposed, longitudinally extending flanges which act in cooperation with the threshold plate to achieve the unitary combination as described.

Figure 6:
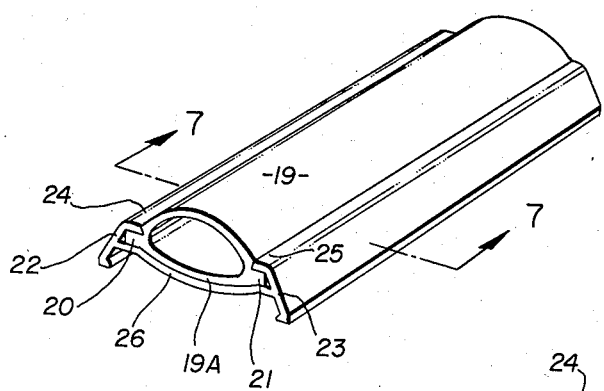
Figure 6 is a perspective view of a modified form of threshold plate with the same vinyl insert as illustrated in Figures 2, 3, 4 and 5 installed therein.
Figure 7:
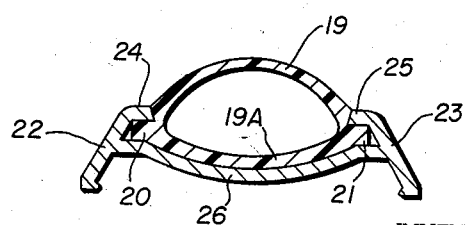
Figure 7 is a horizontal section taken on line 7—7 of Figure 6 on an enlarged scale.

It will also occur to those skilled in the art that the curving sections 11 and 12 shown in the preferred embodiment of the invention just described may be altered without affecting the utility and performance of the threshold plate and one such modification is illustrated in Figures 6 and 7 of the drawings wherein a threshold plate is disclosed which comprises simply a pair of oppositely disposed, angularly positioned flanges 22 and 23, the uppermost edges of which are inturned as at 24 and 25.

The flanges 22 and 23 are interconnected by a downwardly curving transversely extending section 26 which defines the same shape of channel as heretofore disclosed in connection with Figures 1 through 6 of the drawings, and to be adapted to receive, distort and thereby retain the insert 19 having oppositely disposed flanges 20 and 21 thereon.

The form of threshold shown in Figures 6 and 7 may obviously be used on the sides and tops of door casings and frames as well as on the edges of swinging doors and the like so that an effective air seal may be provided between the doors in the casings or frames and between the swinging doors and the like.

It will thus be seen that the vinyl insert-type threshold plate disclosed herein with its novel vinyl insert meets the several objects of the invention.

Having thus described my invention, what I claim is:

1. The combination of a threshold plate comprising a rigid member having a pair of substantially vertically positioned flanges the upper most edges of which are inturned, a connecting section extending between said flanges and lying in vertically spaced relation with respect to said inturned upper edges, said connecting section having the major portion thereof formed in a transverse concave arc, and a tubular vinyl insert having oppositely disposed longitudinally extending flanges thereon positioned in said threshold and distorted thereby with its lower longitudinal half in flattened arcuate face to face registry with said concave arc portion and its upper longitudinal half in upwardly bowed shape whereby said longitudinally extending flanges thereon are held in under said inturned edges of said first mentioned flanges.

2. The combination of a threshold plate comprising a rigid member having a pair of substantially vertically positioned flanges the upper most edges of which are inturned, a connecting section extending between said flanges and lying in vertically spaced relation with respect to said inturned upper edges, said connecting section having the major portion thereof formed in a transverse concave arc, and a tubular vinyl insert having oppositely disposed longitudinally extending flanges thereon positioned in said threshold and distorted thereby with its lower longitudinal half flattened in arcuate face to face registry with said concave arc portion and its upper longitudinal half in upwardly bowed shape whereby said longitudinally extending flanges thereon are held in under said inturned edges of said first mentioned flanges, and a pair of downwardly curving sections secured to the upper ends of said flanges inwardly from their longitudinal edges and lying parallel therewith, said downwardly curving sections forming the upper surface of said threshold plate.

3. The combination of a threshold plate and tubular vinyl insert set forth in claim 2 and wherein the tubular vinyl insert is normally cross sectionally round and wherein it is distorted to an oval shape when installed in said rigid threshold plate.

4. A threshold plate having a longitudinal channel formed in its uppermost surface, flanges on the edges of said threshold plate overlying the sides of said channel the bottom of said channel formed in a transverse concave arc spaced vertically with respect to said flanges and a normally cross sectionally circular tubular vinyl insert adapted to be positioned in said channel in said threshold plate, said vinyl insert having oppositely disposed, longitudinally extending flanges on its opposite sides and said insert disposed in said longitudinal channel, said channel acting to deform said insert to render the lower longitudinal half thereof cross sectionally oval and thereby hold said flanges thereon in under said flanges on said threshold plate.

References Cited in the file of this patent

UNITED STATES PATENTS

| | | |
|---|---|---|
| 693,230 | Burkey | Feb. 11, 1902 |
| 794,424 | Petit | July 11, 1905 |
| 2,661,229 | Slaughter | Dec. 1, 1953 |